(12) United States Patent
Foss et al.

(10) Patent No.: US 7,921,734 B2
(45) Date of Patent: Apr. 12, 2011

(54) SYSTEM TO DETECT POOR PROCESS GROUND CONNECTIONS

(75) Inventors: Scot R. Foss, Eden Prairie, MN (US); William G. Totenhagen, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 46 days.

(21) Appl. No.: 12/464,409

(22) Filed: May 12, 2009

(65) Prior Publication Data
US 2010/0288054 A1 Nov. 18, 2010

(51) Int. Cl.
*G01F 1/58* (2006.01)
*G01F 1/00* (2006.01)
*G01R 31/14* (2006.01)

(52) U.S. Cl. ............... 73/861.12; 702/45; 324/509
(58) Field of Classification Search ............... None
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,855,858 A | 12/1974 | Cushing | 73/194 EM |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,337,516 A | 6/1982 | Murphy et al. | 364/551 |
| 4,399,824 A | 8/1983 | Davidson | 128/736 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,571,689 A | 2/1986 | Hildebrand et al. | 364/481 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |

(Continued)

FOREIGN PATENT DOCUMENTS

DE  32 13 866 A1  10/1983

(Continued)

OTHER PUBLICATIONS

"Microsoft Press Computer Dictionary" 2nd Edition, 1994, Microsoft Press. p. 156.

(Continued)

*Primary Examiner* — Harshad Patel
(74) *Attorney, Agent, or Firm* — Westman, Champlin & Kelly, P.A.

(57) ABSTRACT

A magnetic flowmeter is disclosed that includes a pair of electrodes coupled to a process fluid and a diagnostic circuit coupled to the pair of electrodes to monitor a common mode signal. The diagnostic circuit is adapted to detect a poor ground connection associated with at least one electrode of the pair of electrodes based on line noise associated with the common mode signal.

19 Claims, 6 Drawing Sheets

U.S. PATENT DOCUMENTS

| | | | |
|---|---|---|---|
| 4,668,473 A | 5/1987 | Agarwal | 422/62 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,777,585 A | 10/1988 | Kokawa et al. | 364/164 |
| 4,807,151 A | 2/1989 | Citron | 364/510 |
| 4,831,564 A | 5/1989 | Suga | 364/551.01 |
| 4,841,286 A | 6/1989 | Kummer | 340/653 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,367,612 A | 11/1994 | Bozich et al. | 395/22 |
| 5,370,000 A | 12/1994 | Herwig et al. | 73/861.17 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogure | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,779 A | 4/1996 | Maltby et al. | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,560,246 A | 10/1996 | Bottinger et al. | 73/861.15 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,623,605 A | 4/1997 | Keshav et al. | 395/200.17 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,644,240 A | 7/1997 | Brugger | 324/439 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | 395/23 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,700,090 A | 12/1997 | Eryurek | 374/210 |
| 5,703,575 A | 12/1997 | Kirkpatrick | 340/870.17 |
| 5,704,011 A | 12/1997 | Hansen et al. | 395/22 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.061 |
| 5,710,370 A | 1/1998 | Shanahan et al. | 73/1.35 |
| 5,713,668 A | 2/1998 | Lunghofer et al. | 374/179 |
| 5,719,378 A | 2/1998 | Jackson, Jr. et al. | 219/497 |
| 5,736,649 A | 4/1998 | Kawasaki et al. | 73/861.23 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,747,701 A | 5/1998 | Marsh et al. | 73/861.23 |
| 5,752,008 A | 5/1998 | Bowling | 395/500 |
| 5,764,891 A | 6/1998 | Warrior | 395/200.2 |
| 5,781,878 A | 7/1998 | Mizoguchi et al. | 701/109 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,828,567 A | 10/1998 | Eryurek et al. | 700/79 |
| 5,829,876 A | 11/1998 | Schwartz et al. | 374/1 |
| 5,848,383 A | 12/1998 | Yunus | 702/102 |
| 5,859,964 A | 1/1999 | Wang et al. | 395/185.01 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,908,990 A | 6/1999 | Cummings | 73/861.22 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/130 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 702/122 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |

| | | | |
|---|---|---|---|
| 6,017,143 A | 1/2000 | Eryurek et al. ............... 700/51 |
| 6,038,579 A | 3/2000 | Sekine ........................ 708/400 |
| 6,045,260 A | 4/2000 | Schwartz et al. ............ 374/183 |
| 6,047,220 A | 4/2000 | Eryurek et al. ............... 700/28 |
| 6,047,222 A | 4/2000 | Burns et al. .................. 700/79 |
| 6,052,655 A | 4/2000 | Kobayashi et al. ........... 702/184 |
| 6,119,047 A | 9/2000 | Eryurek et al. ............... 700/28 |
| 6,119,529 A | 9/2000 | Di Marco et al. ........... 73/861.68 |
| 6,151,560 A | 11/2000 | Jones ............................ 702/58 |
| 6,192,281 B1 | 2/2001 | Brown et al. ................... 700/2 |
| 6,195,591 B1 | 2/2001 | Nixon et al. .................. 700/83 |
| 6,199,018 B1 | 3/2001 | Quist et al. ................... 702/34 |
| 6,209,048 B1 | 3/2001 | Wolff ........................... 710/62 |
| 6,236,948 B1 | 5/2001 | Eck et al. ..................... 702/45 |
| 6,237,424 B1 | 5/2001 | Salmasi et al. ............ 73/861.17 |
| 6,263,487 B1 | 7/2001 | Stripf et al. .................... 717/1 |
| 6,298,377 B1 | 10/2001 | Hartikainen et al. ......... 709/223 |
| 6,311,136 B1 | 10/2001 | Henry et al. .................. 702/45 |
| 6,327,914 B1 | 12/2001 | Dutton ..................... 73/861.356 |
| 6,392,416 B1 | 5/2002 | Keech et al. ................. 324/438 |
| 6,611,775 B1 * | 8/2003 | Coursolle et al. .............. 702/65 |
| 6,859,755 B2 | 2/2005 | Eryurek et al. ............... 702/183 |
| 6,907,383 B2 | 6/2005 | Eryurek et al. ............... 702/183 |

FOREIGN PATENT DOCUMENTS

| | | |
|---|---|---|
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 19930660 A1 | 7/1999 |
| DE | 299 17 651 U1 | 12/2000 |
| DE | 601 23 044 T2 | 4/2007 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| JP | 58-129316 | 8/1983 |
| JP | 59-116811 | 7/1984 |
| JP | 59163520 | 9/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 60174915 | 9/1985 |
| JP | 62-30915 | 2/1987 |
| JP | 64-1914 | 1/1989 |
| JP | 64-72699 | 3/1989 |
| JP | 2-5105 | 1/1990 |
| JP | 03229124 | 10/1991 |
| JP | 5-122768 | 5/1993 |
| JP | 06242192 | 9/1994 |
| JP | 7-63586 | 3/1995 |
| JP | 07234988 | 9/1995 |
| JP | 8-54923 | 2/1996 |
| JP | 8-136386 | 5/1996 |
| JP | 8-166309 | 6/1996 |
| JP | 08247076 | 9/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11083575 | 3/1999 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/20469 | 5/1998 |
| WO | WO 00/70531 | 11/2000 |
| WO | WO 01/90704 A2 | 11/2001 |
| WO | WO0190704 * | 11/2001 |

OTHER PUBLICATIONS

International Search Report from U.S. Appl. No. PCT/US01/40791 with international filing date of May 22, 2001.

"On-Line Tool Condition Monitoring System With Wavelet Fuzzy Neural Network," by Li Xiaoli et al., pp. 271-276 (1997).

Michalski et al.; "Optimal Design of the Coils of an Electromagnetic Flow Meter"; IEEE Transactions on Magnetics; vol. 34, Issue 5; Part 1; 1998, pp. 2563-2566.

Popa et al.; "Magnetic Fluid Flow Meter for Gases" IEEE Transactions on Magnetics; vol. 30; Issue 2; Part 102; 1993; pp. 936-938.

Michalski, A.; "New Approach to a Main Error Estimation for Primary Transducer of Electromagnetic Flow Meter"; IEEE Instrumentation and Measurement Technology Conference Proceedings; vol. 2; 1998; pp. 1093-1097.

"Improving Dynamic Performance of Temperature Sensors With Fuzzy Control Techniques," by Wang Lei et al., pp. 872-873 (1992).

Amadi-Echendu et al.; "Additional Information from Flowmeters via Signal Analysis"; IEEE Instrumentation and Measurement Technology Conference Record; vol. 7; 1990; pp 187-193.

"A TCP\IP Tutorial" by, Socolofsky et al., Spider Systems Limited, Jan. 1991 pp. 1-23.

"Approval Standards for Explosionproof Electrical Equipment General Requirements", Factory Mutual Research, Cl. No. 3615, Mar. 1989, pp. 1-34.

"Approval Standard Intrinsically Safe Apparatus and Associated Apparatus for Use in Class I, II, and III, Division 1 Hazardous (Classified) Locations", Factory Mutual Research, Cl. No. 3610, Oct. 1988, pp. 1-70.

"Automation On-line" by, Phillips et al., Plant Services, Jul. 1997, pp. 41-45.

"Climb to New Heights by Controlling your PLCs Over the Internet" by, Phillips et al., Intech, Aug. 1998, pp. 50-51.

"CompProcessor for Piezoresistive Sensors" MCA Technologies Inc. (MCA7707), pp. 1-8.

"Ethernet emerges as viable, inexpensive fieldbus", Paul G. Schreier, Personal Engineering, Dec. 1997, p. 23-29.

"Ethernet Rules Closed-loop System" by, Eidson et al., Intech, Jun. 1998, pp. 39-42.

"Fieldbus Standard for Use in Industrial Control Systems Part 2: Physical Layer Specification and Service Definition", ISA-S50.2-1992, pp. 1-93.

"Fieldbus Standard for Use in Industrial Control Systems Part 3: Data Link Service Definition", ISA-S50.2-1997, Part 3, Aug. 1997, pp. 1-159.

Fieldbus Standard for Use in Industrial Control Systems Part 4: Data Link Protocol Specification, ISA-S50.2-1997, Part 4, Aug. 1997, pp. 1-148.

"Fieldbus Support for Process Analysis" by, Blevins et al., Fisher-Rosemount Systems, Inc., 1995, pp. 121-128.

"Fieldbus Technical Overview Understanding Foundation™ fieldbus technology", Fisher-Rosemount, 1998, pp. 1-23.

"Hypertext Transfer Protocol—HTTP/1.0" by, Berners-Lee et al., MIT/LCS, May 1996, pp. 1-54.

"Infranets, Intranets, and the Internet" by, Pradip Madan, Echelon Corp, Sensors, Mar. 1997, pp. 46-50.

"Internet Technology Adoption into Automation" by, Fondl et al., Automation Business, pp. 1-5.

"Internet Protocol Darpa Internet Program Protocol Specification" by, Information Sciences Institute, University of Southern California, RFC 791, Sep. 1981, pp. 1-43.

"Introduction to Emit", emWare, Inc., 1997, pp. 1-22.

"Introduction to the Internet Protocols" by, Charles L. Hedrick, Computer Science Facilities Group, Rutgers University, Oct. 3, 1988, pp. 1-97.

"Is There a Future for Ethernet in Industrial Control?", Miclot et al., Plant Engineering, Oct. 1988, pp. 44-46, 48, 50.

LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"Modular Microkernel Links GUI and Browser for Embedded Web Devices" by, Tom Williams, pp. 1-2.

"PC Software Gets Its Edge From Windows, Components, and the Internet", Wayne Labs, I&CS, Mar. 1997, pp. 23-32.

Proceedings Sensor Expo, Aneheim, California, Produced by Expocon Managemnet Associates, Inc., Apr. 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-78.

"On-Line Statistical Process Control for a Glass Tank Ingredient Scale," by R.A. Weisman, *IFAC real Time Programming*, 1985, pp. 29-38.

"The Performance of Control Charts for Monitoring Process Variation," by C. Lowry et al., *Commun. Statis.—Simula.*, 1995, pp. 409-437.

"A Knowledge-Based Approach for Detection and Diagnosis of Out-Of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

Parallel, Fault-Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990).

"Software-Based Fault-Tolerant Control Design for Improved Power Plant Operation," *IEEE/IFAC Joint Symposium on Computer-Aided Control System Design*, Mar. 7-9, 1994 pp. 585-590.

A Standard Interface for Self-Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1-4.

"Application of Neural Computing Paradigms for Signal Validation," by B.R. Upadhyaya et al., *Department of Nuclear Engineering*, pp. 1-18.

"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B.R. Upadhyaya et al., *ISA*, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer for Use Up to 1600° C", by M.J. de Groot et al., Cal Lab, Jul./Aug. 1996, pp. 38-41.

"Survey, Applications, and Prospects of Johnson Noise Thermometry," by T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Thermocouple Continuity Checker," IBM Technical Disclosure Bulletin, vol. 20, No. 5, pp. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6[Th]. WWW Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED- vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in a Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schröder, pp. 557-565 (1990).

"Fault Diagnosis of Fieldbus Systems," by Jürgen Quade, pp. 577-581 (Oct. 1992).

"Ziele und Anwendungen von Feldbussystemen," by T. Pfeifer et al., pp. 549-557 (Oct. 1987).

"Profibus-Infrastrukturmaßnahmen," by Tilo Pfeifer et al., pp. 416-419 (Aug. 1991).

"Simulation des Zeitverhaltens von Feldbussystemen," by O. Schnelle, pp. 440-442 (1991).

"Modelisation et simulation d'un bus de terrain: FIP," by Song et al, pp. 5-9 (undated).

"Feldbusnetz für Automatisierungssysteme mit intelligenten Funktionseinheiten," by W. Kriesel et al., pp. 486-489 (1987).

"Bus de campo para la inteconexión del proceso con sistemas digitales de control," Tecnología, pp. 141-147 (1990).

"Dezentrale Installation mit Echtzeit-Feldbus," Netzwerke, Jg. Nr.3 v. 14.3, 4 pages (1990).

"Process Measurement and Analysis," by Liptak et al., Instrument Engineers' Handbook, Third Edition, pp. 528-530, (1995).

Search Report and Written Opinion from corresponding PCT application Serial No. PCT/US2010/034182, dated Nov. 9, 2010.

\* cited by examiner

SYSTEM TO DETECT POOR PROCESS GROUND CONNECTIONS

FIELD

The present disclosure is generally related to a system to detect poor process ground connections, and more particularly but not by limitation to systems to detect poor ground connections within industrial process monitoring field devices, such as magnetic flow meters.

BACKGROUND

Field devices are used in industrial process monitoring and/or control systems to monitor process parameters associated with a particular process. Such process parameters can include fluid pressure, fluid flow rate, fluid temperature, other process variables, or any combination thereof.

Magnetic flow meters are a type of field device that is used to measure a fluid flow rate of a conductive process fluid as it flows within a flow tube that is coupled to a pipe. A particular magnetic flow meter includes an electromagnet and electrodes. In accordance with Faraday's law of electromagnetic induction, the electromagnet is used apply a magnetic field to the process fluid within the flow tube to induce an electromotive force (EMF) in the process fluid, which EMF is proportional to the flow rate. The electrodes are positioned in the flow tube to make electrical contact with the flowing process fluid to sense the EMF. In a particular embodiment, the EMF is measured by the flow meter using an amplifier connected across the electrodes to amplify the EMF signal and using an analog-to-digital converter (ADC) to quantize the output of the amplifier to produce a data value related to the fluid flow rate. In a particular example, the EMF is measured relative to a signal ground, which may be tied to the process fluid. The electrical potential of the process fluid can be used as a reference, which may not necessarily represent an Earth ground connection.

The magnetic flow meter and associated transmitter circuitry are referenced to the process to provide a stable reading. This process or ground connection is established via an electrical connection between the flow tube and the process. The ground connection can be established using ground rings, which strap to the flow tube, a ground electrode which is connected directly to the flow tube, a strap between the flow tube and the adjacent conductive pipe, another ground connection, or any combination thereof. In a particular embodiment, earth ground can provide a low noise reference and often is required by electrical safety code. However, poor ground connections can lead to erroneous process measurements.

SUMMARY

In a particular embodiment, a field device is disclosed that includes a pair of electrodes coupled to a process fluid and a diagnostic circuit coupled to the pair of electrodes to monitor a common mode signal. The diagnostic circuit is adapted to detect a poor ground connection associated with at least one electrode of the pair of electrodes based on line noise associated with the common mode signal.

In another particular embodiment, a magnetic flow meter is disclosed for measuring a flow rate of a fluid in a pipe. The magnetic flow meter includes a flow tube adapted to couple to a pipe to carry a fluid, a magnetic coil disposed adjacent to the flow tube to induce an electromagnetic force (EMF) within the fluid, and at least two electrodes disposed within the pipe, the at least two electrodes being electrically isolated from the flow tube and from one another. The magnetic flow meter further includes measurement circuitry coupled to the at least two electrodes and adapted to measure flow rate based on the induced EMF and includes diagnostic circuitry coupled to the at least two electrodes to monitor a common mode signal. The diagnostic circuitry is adapted to detect a poor electrical ground connection when line noise associated with the common mode signal exceeds a noise threshold.

DETAILED DESCRIPTION OF ILLUSTRATIVE EMBODIMENTS

Magnetic flow meters and other field device utilize a ground connection to the conductive process fluid to provide for accurate process measurements. If a proper ground connection is not present, the differential voltage signal sensed at electrodes of the magnetic flow meter, for example, may experience line noise, such as noise signals within a frequency range of approximately 50 to 60 Hz, from the surrounding process environment. Such differential noise signals can interfere with the flow rate measurement resulting in large measurement variability. In a particular embodiment, the differential voltage can be determined according to the following equation:

$$V_{Diff} = V_1 + V_{Noise1} - (V_2 + V_{Noise2}) \qquad \text{(Equation 1)}$$

If a difference between the noise voltage signals (VNoise1 and VNoise2) is greater than a diagnostic noise threshold or limit, diagnostic circuitry is provided that is adapted to generate an alert relating to a ground/wiring fault.

In addition, a poor process ground connection can lead to common mode voltage line noise that interferes with the electrode voltage signal. In a particular embodiment, the common mode voltage line noise is prevalent in a frequency range from approximately 50 to 60 Hz. It should be understood that the line noise may be influenced by ambient process noise and vibrations, by nearby radio frequency signals, by other sources of noise, or any combination thereof. The common mode line noise can adversely impact amplification circuitry, for example, by causing amplifiers associated with the field device to enter a saturation condition if the common mode voltage portion of the electrode voltage signal exceeds current limits. In a magnetic flow meter, the saturation point can be the upper and lower limits of first and second voltages ($V_1$ and $V_2$) associated with the respective electrodes. The saturation point can be determined according to the following equation:

$$V_{Sat} = V_1 + V_{Noise1} \quad \text{(Equation 2)}$$

$$V_{Sat} = V_2 + V_{Noise2} \quad \text{(Equation 3)}$$

Amplifier saturation tends to distort the differential measurements to a lower value, which can limit differential line noise detected by the transmitter to the point that existing line noise diagnostics do not report ground/wiring fault conditions. Unfortunately, if the differential measurements are reduced, the differential mode line noise may be insufficient for detection of a poor electrical ground connection.

In a particular embodiment, a magnetic flow meter is provided that includes diagnostic circuitry coupled to electrodes within a flow tube of the magnetic flow meter. The diagnostic circuitry is adapted to examine the line noise amplitude of the common mode electrode signal (and optionally the differential mode electrode signal) to detect a poor or poor ground connection. By examining the common mode voltage line noise, a poor electrical ground connection can be detected even when the differential mode electrode signal is relatively small (not large enough to detect a poor electrical ground connection).

In a particular example, the diagnostic circuitry is adapted to monitor line noise associated with the common mode electrode voltage in addition to the differential line noise. In a particular embodiment, the common mode line noise provides a better indication of the presence of a poor or poor process ground connection. In some instances, there may be sufficient common mode line noise to saturate the amplifiers, but very little differential line noise may be present.

Figure 1:
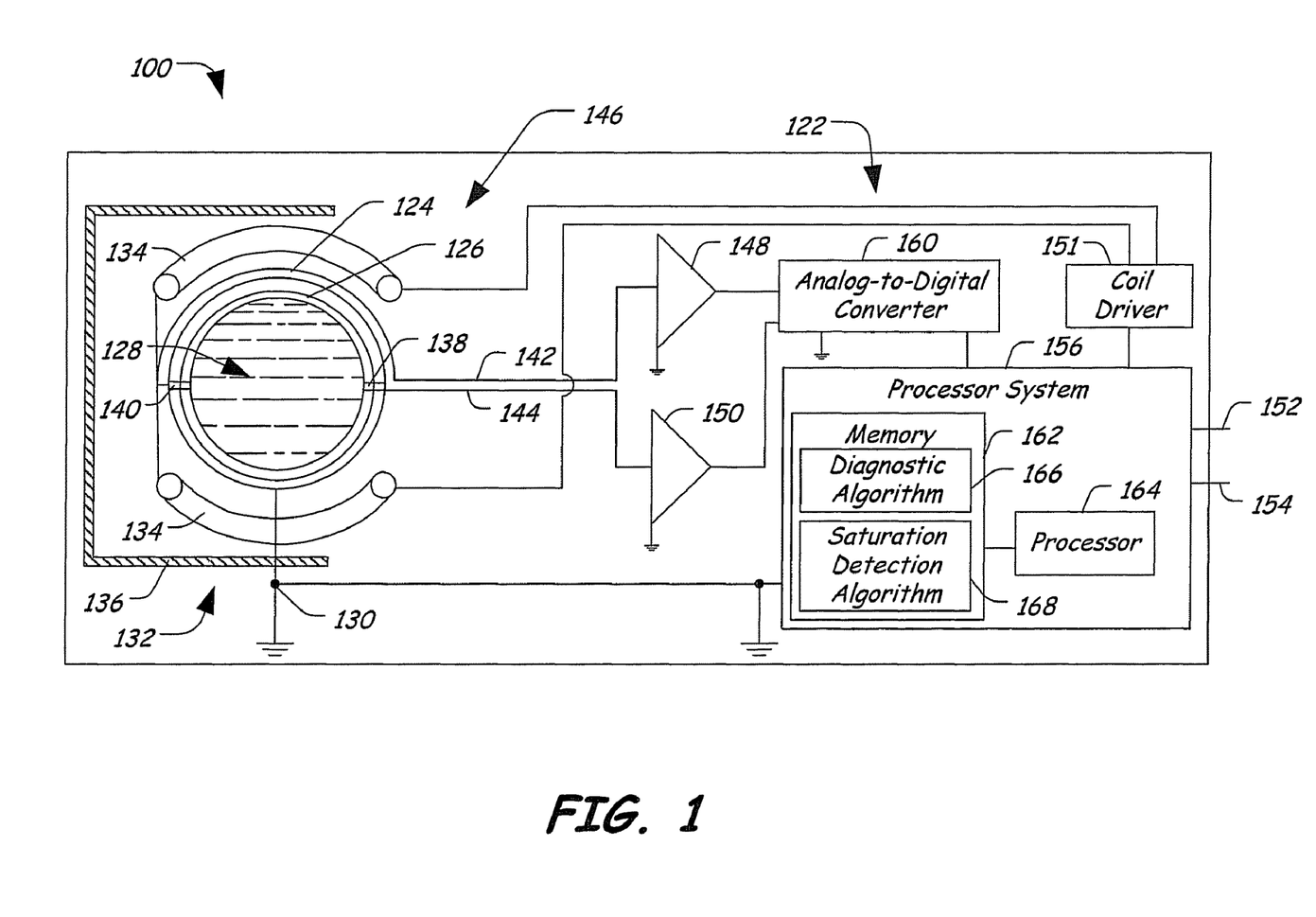
FIG. 1 is a diagram of a particular illustrative embodiment of a magnetic flow meter including a system to detect a poor ground connection.

FIG. 1 is a diagram of a particular illustrative embodiment of a magnetic flow meter 100 including a system to detect a poor electrical ground connection. The magnetic flow meter 100 includes an electrode circuit 146 and a diagnostic circuit 122, which can sense a poor ground connection associated with the electrode circuit 146 and provide an indication via at least one of the output lines 152 and 154 to a control system, a display device, a transmitter, or any combination thereof when a poor electrical ground connection is detected.

The magnetic flow meter 100 includes a flow tube 124 that has an insulated tube or liner 126 adapted to carry a flowing liquid 128 that is coupled to an electrical ground 130. The coupling of the liquid 128 to ground is usually completed by way of contact between the liquid 128 and a metal pipe that is attached to the flow tube 124. The flow tube 124 includes an electromagnet 132. The electromagnet 132 includes coils 134 and a magnetic return path or core, illustrated schematically at 136. Further, the flow tube 124 includes first and second electrodes 138 and 140 and electrode leads 142 and 144, which form an electrode circuit 146.

In a particular embodiment, the electrode circuit 146 can also include first and second amplifiers 148 and 150. In a particular example, the first and second amplifiers 148 and 150 are unity gain buffers (sometimes referred to as impedance converters) that have extremely high impedance, low leakage inputs and low impedance outputs. The first and second amplifiers 148 and 150 replicate the electrode voltages from the electrodes 138 and 140 at the corresponding amplifier outputs and isolate the electrodes 138 and 140 from the loads connected to the outputs of the first and second amplifiers 148 and 150. The first and second amplifiers 148 and 150 may be coupled to the flow tube 124 or disposed within a housing associated with the magnetic flow meter 100, depending on the particular implementation.

The diagnostic circuit 122 includes an analog-to-digital converter (ADC) 160 coupled to the electrode circuit 146 via the first and second amplifiers 148 and 150 and to the electrical ground 130. The ADC 160 is adapted to generate an output signal related to the outputs of the first and second amplifier 148 and to provide the output signal a processor system 156, which is coupled to a coil driver 151 and to outputs 152 and 154, which may be coupled to loop wiring to receive power and to communicate data. The coil driver 151 can be controlled by the processor system 156 to apply a signal to the coils 134. In a particular embodiment, the coil driver 151 applies an approximately square wave drive or excitation current to the electromagnet 132, and the corresponding electrode potentials are also approximately square waves, including "flat" time intervals when the flow induced EMF is flat or stable. In this example, the diagnostic potentials can be sampled by the ADC 160 during the time intervals when the flow-induced EMF is flat or stable.

The processor system 156 includes a memory 162 and a processor 164 having access to the memory. The memory 162 is adapted to store a diagnostic algorithm 166 that is executable by the processor 164 to diagnose electrode leakage, which may be related to process fluid leaking past a damaged seal or related to another source, based on the output of the ADC 160. Further, the memory 162 stores a saturation detection algorithm 168 that is executable by the processor 164 to monitor a common mode signal and a differential mode signal related to the electrodes 138 and 140 at particular frequencies to detect line noise associated with a poor connection to the electrical ground 130. In a particular embodiment, the poor connection may result from a loose wire, corrosion, improper installation, or any combination thereof. In a particular embodiment, the saturation detection algorithm 168 can detect saturation of the first and second amplifiers 148 and 150 to infer a faulty connection to the electrical ground 130. In a particular example, the saturation detection algorithm 168 is adapted to monitor a common mode voltage line noise associated with the electrodes 138 and 140, which noise is prevalent in a frequency range from approximately 50 to 60 Hz.

In a particular embodiment, the processor system 156 is adapted to generate a first diagnostic output related to electrode leakage (i.e., process fluid in contact with circuitry associated with the flow meter 100) and/or to generate a second diagnostic output related to a poor or faulty connection to the electrical ground 130. In a particular embodiment, electrical potentials between the outputs of the amplifiers 148 and 150 require a liquid ground reference. In a particular embodiment, if the ground connection is poorly centered or balanced relative to the electrode potentials, then the processor 164 can use the diagnostic algorithm 166 to infer electrode leakage. However, if the electrical ground 130 connection is poor or faulty, common mode line noise can drive the first and second amplifiers 148 and 150 into saturation, which saturation can be detected by the processor 164 using the saturation detection algorithm 168.

In a particular example, when the electrode circuit 146 is free of leakage, it is found that the flow-induced EMF on each electrode relative to the electrical ground (diagnostic potentials) tends to be balanced or equal, but of opposite polarity. Accordingly, when they are added together, the result tends to be near zero under normal operating conditions without leakage. However, if the connection to electrical ground 130 is faulty, even if the EMF remains balanced, the common mode line noise can drive the amplifiers 148 and 150 into saturation.

Thus, the saturation detection algorithm 168 that is executed by the processor 164 can be used to diagnose poor electrical ground connections, even when the flow meter 100 may appear to be operating correctly.

In a particular embodiment, the outputs 152 and 154 will carry a 4-20 mA analog loop signal, and the diagnostic output at the output terminal 154 can be a HART protocol signal superimposed on the 4-20 mA analog loop signal. In another particular embodiment, the outputs 152 and 154 can be loop wires that carry a different protocol signal. In still another embodiment, the outputs 152 and 154 can be coupled to a wireless transceiver to send information to and receive information from a control system.

Figure 2:
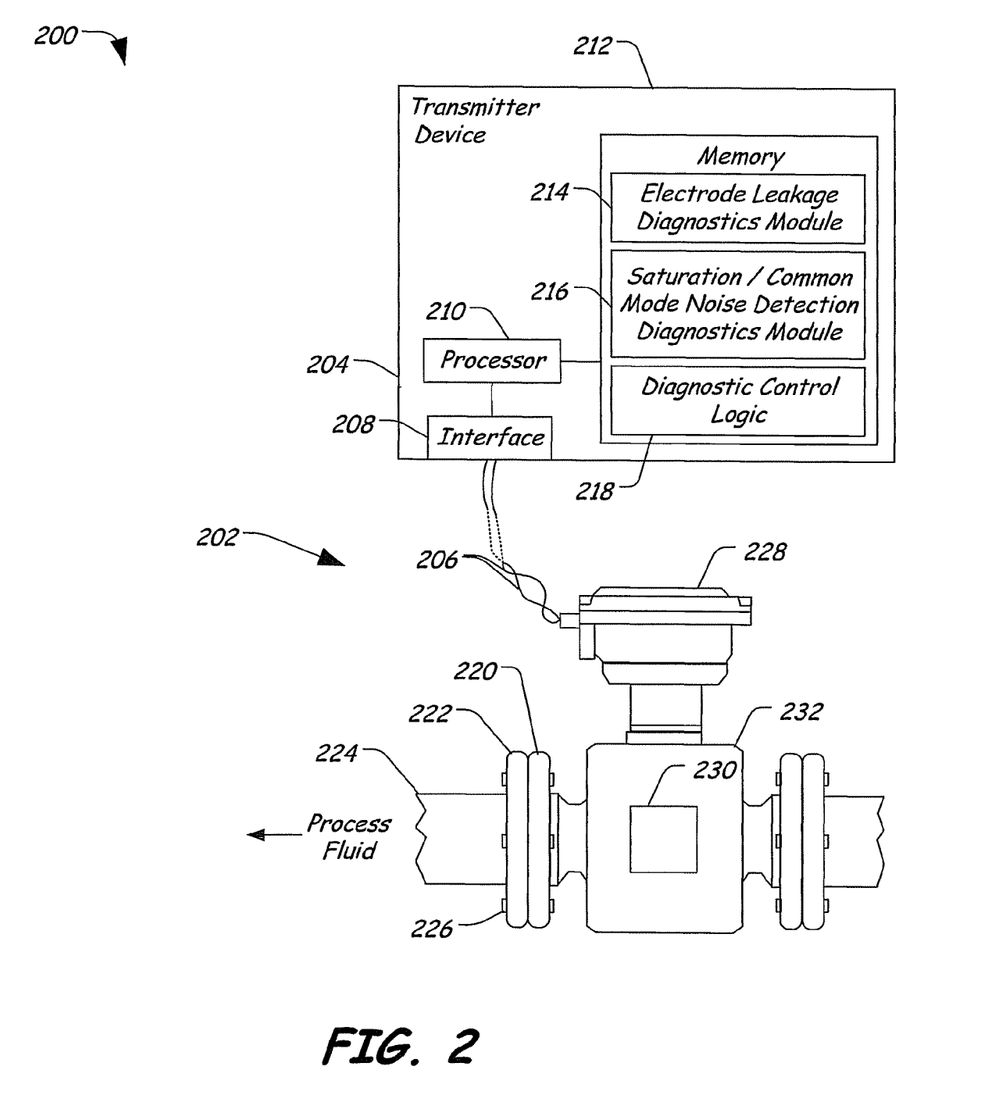
FIG. 2 is a diagram of a particular illustrative embodiment of a magnetic flow meter system coupled to a system to detect a poor ground connection.

FIG. 2 is a diagram of a particular illustrative embodiment of a magnetic flow meter system 200 coupled to a system to detect a poor electrical ground connection. The magnetic flow meter assembly 200 includes a magnetic flow meter 202 coupled to a transmitter device 204 via wiring 206. In a particular embodiment, the transmitter device 204 can be replaced with a control device. Further, in another particular embodiment, wireless transmitter circuitry may be included within the housing 228 of the magnetic flow meter 202, which transmitter circuitry allows the magnetic flow meter 202 to communicate data wirelessly.

The transmitter device 204 includes an interface 208 coupled to the wiring 206. The interface 208 is coupled to a processor 210 to communicate received data. The processor 210 is coupled to a memory 212, which includes instructions executable by the processor 210 to detect a poor electrical ground connection. In a particular example, the memory 212 includes an electrode leakage diagnostics module 214 that is executable by the processor 210 to detect electrode leakage (process fluid leakage) based on detected voltage potentials associated with the electrode circuit 146. Additionally, the memory 212 includes a saturation/common mode noise detection diagnostics module 216 that is executable by the processor 210 to detect saturation of amplifiers within the magnetic flow meter 202 to infer line noise indicative of a poor electrical ground connection. Further, the saturation/common mode noise detection diagnostics module 216 is adapted to monitor the common mode line noise and to compare it to a noise threshold to detect a poor electrical ground connection. Further, the memory 212 includes a diagnostic control logic module 218 that is executable by the processor 210 to generate an alert based on the determinations made using the electrode leakage diagnostics module 214 and the saturation/common mode noise detection diagnostics logic 216. The alert may be communicated to a display interface or to a control system (not shown). Alternatively, the transmitter device 204 can be a control system and the magnetic flow meter 202 may be adapted to communicate raw measurement data to the control device via the wiring 206.

The flow meter 202 includes electrical interconnects and magnetic coils (shown in FIG. 1) and provides isolation for such circuitry from the environment and from the process fluid. Generally, the magnetic flow meter 202 is coupled to pipe section 224 by flanges 220 and corresponding pipe flanges 222 using threaded fasteners 226. Though FIG. 2 illustrates a pipe section 224, which is a tube, the flow meter 202 can be coupled to other types of fluid conveying structures as well. As used herein, the term "pipe" refers generally to any conduit for conveying fluid, including a tube, a channel, and the like.

The flow meter 202 further includes a housing 228 to house circuitry associated with the flow meter 202 and includes a flow tube 232. In a particular embodiment, the flow tube 232 can include an access panel 230 to permit operator access to electrode wiring within the flow tube 232.

Depending on the implementation, the flow tube 232 may be electrically grounded to the pipe 224. Alternatively, the flow tube 232 may provide a process ground connection that may or may not correspond to an earth ground-type of connection. In a particular example, the flow meter 202 is adapted to monitor a process fluid that is flowing within the pipe 224 and through the flow tube 232 based on Faraday's law of magnetic induction. Raw data associated with the flow measurements can be communicated to the transmitter device 204 via the wiring 206. The processor 210 of the transmitter device 204 is adapted to access the saturation detection diagnostics module 216

Figure 3:
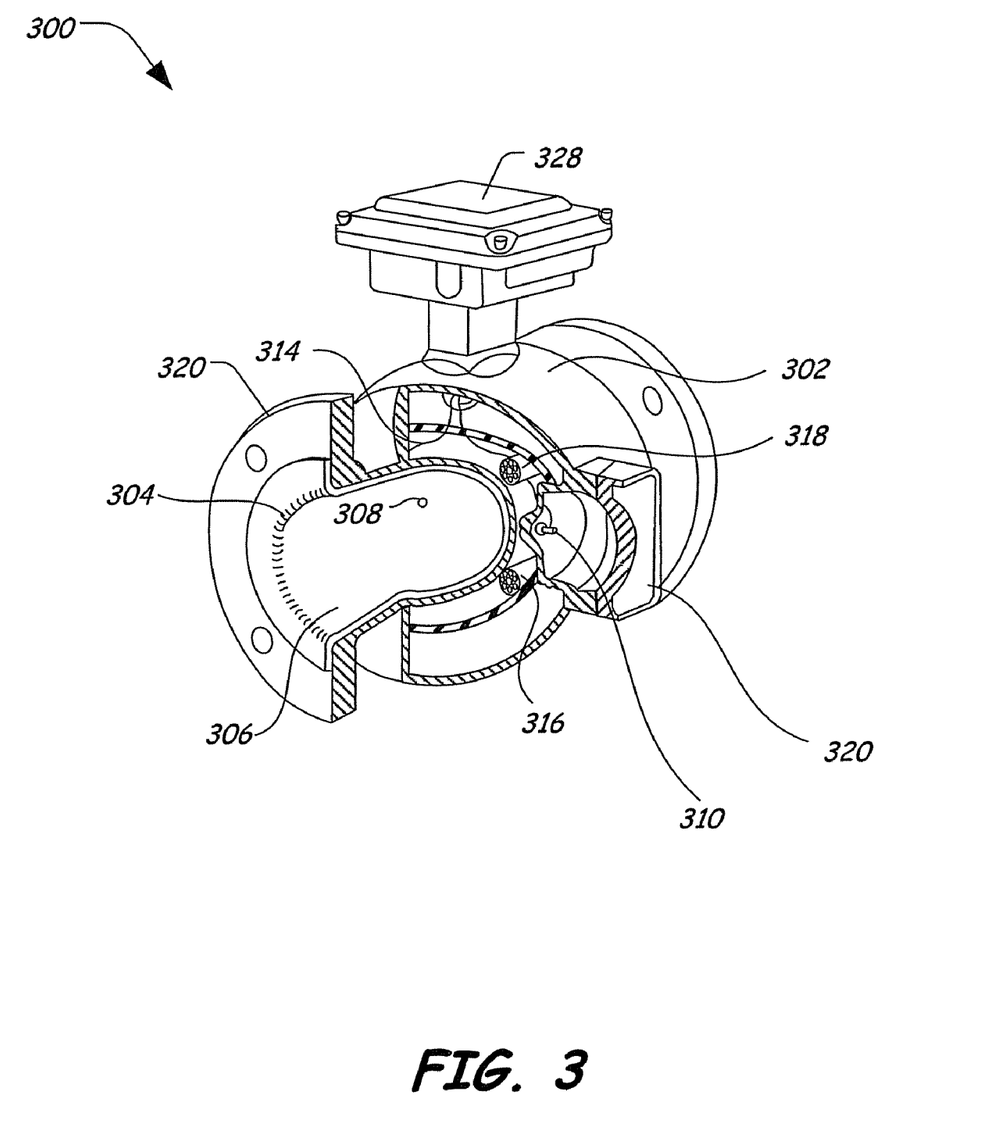
FIG. 3 is a diagram of a particular illustrative embodiment of a magnetic flow meter system, such as the magnetic flow meter illustrated in FIG. 2, with a portion shown in cross-section, which flow meter system includes a transmitter with circuitry to detect a poor ground connection.

FIG. 3 is a diagram of a particular illustrative embodiment of a magnetic flow meter assembly 300, such as the flow meter 202 illustrated in FIG. 2, with a portion shown in cross-section, which flow meter assembly 300 includes a transmitter housing 320 including electrical ground fault diagnostic circuitry. The magnetic flow meter assembly 300 includes a flow tube section 302 with flanges 320 for coupling to a pipe or conduit of an industrial process. The flow tube section 302 defines a passage 304 for fluid flow. Generally, the flow tube section 302 is formed of a rigid material, such as nonmagnetic stainless steel for pressure containment, and the passage 304 may be lined with an electrically insulating liner 306, such as Teflon, polyurethane, Tefzel, other plastic resin, ceramic, or other types of electrically insulating materials. For lower pressure applications, the flow tube section 302 can be formed from electrically insulating material, in which case the liner 306 may be omitted. Other designs of the fluid passage 304 can be used as well. For example, a metal pipe section can be used having only a partial insulating lining such as an insulating annulus about each electrode.

Additionally, though the flow meter assembly 300 is shown with flange elements 320, other connection structures may be used. In an alternative embodiment, the flow tube section 302 can be formed without flanges, and the flow meter assembly 300 can be clamped between flanges of mating pipes using extended bolts to cage the flow meter assembly 300. The flow meter assembly 300 includes transmitter circuitry 312, which includes electrode circuitry 314 and diagnostic circuitry (such as the diagnostic circuitry 122 illustrated in FIG. 1) within the transmitter housing 328. The transmitter housing 328 can include a releasable cover to allow operator access to an electrical distribution block and electrical circuitry within the transmitter housing 328. Electrical leads 314 extend from within the housing 328 into the flow tube section 302 to connect to electrodes, such as the electrodes 308 and 310, and to magnetic coils 316 and 318. Further, an access panel 320 is provided to allow operator access to wiring within the flow tube section 302.

In a particular embodiment, the magnetic coils 316 and 318 are excited to generate a magnetic field, which induces a voltage in the process fluid flow within the flow tube section 302. Process monitoring circuitry, such as the electrode circuitry with the transmitter housing 328, measures the voltage potential between the two electrodes 308 and 310, which can be used to determine a rate of fluid flow. Specifically, the magnitude of the induced voltage (E) is directly proportional to the velocity of the conducting fluid (V), the conductor width (W), and the strength of the magnetic field (B) according to the following equation: $E=kBWV$, where the variable (k) represents a constant. The magnetic field coils 316 and 318 are generally positioned on opposing sides of the flow tube section 302 to generate and apply the magnetic field. Since the width (W) is the spacing between the electrodes and the magnetic field (B) is controlled by the magnetic coils 316 and 318, the only variable is the velocity (V) of the process fluid. The liner 306 (or an insulating element) prevents the voltage signal from shorting to the pipe wall. Thus, the output voltage (E) is directly proportional to the liquid velocity, resulting in an inherently linear output. This output voltage (E) may also be referred to as an "electromotive force" (EMF), a "flow signal", a "potential" or an "electrode voltage".

As the conductive process fluid moves through the induced magnetic field with average velocity (V), the circuitry within the transmitter housing 328 measures the voltage potential across electrodes 308 and 310. Further, the circuitry within the transmitter housing 328 can monitor common mode and/or differential mode line noise to detect a poor electrical ground connection. In a particular embodiment, the circuitry within the transmitter housing 328 can execute a diagnostic procedure when the pipe is empty to detect a poor ground connection based on line noise, which noise may drive amplifiers associated with the circuitry within the transmitter housing 328 into saturation. Such saturation may be indicative of a faulty ground connection. It should be understood that electrodes 308 and 310 contact the fluid in the passage 304 (when liquid is present), and the fluid completes a circuit between the electrodes 308 and 310. When fluid is not present, the electrodes 308 and 310 represent an open circuit. Nevertheless, line noise may be present if the electrical ground connection is faulty. In another particular embodiment, the circuitry can execute the diagnostic procedure during operation to detect a poor electrical ground connection based on common mode line noise. Further, the diagnostic procedure can include measuring differential mode line noise to infer which conductor may have the poor electrical ground connection.

In a particular embodiment, the circuitry within the housing 328 is adapted to detect a poor electrical ground connection by monitoring common mode line noise within a selected frequency range. In a particular example, the selected frequency range is from approximately 50 Hz to 60 Hz. In another particular example, the selected frequency range can be configured via commands from a host system or by a user via a user input interface to define a frequency range according to the particular implementation. For example, a particular process environment may include process noise that is within a particular frequency range, and the circuitry may be tuned (configured) to monitor such noise within the particular frequency range to detect the poor electrical ground connection.

Figure 4:
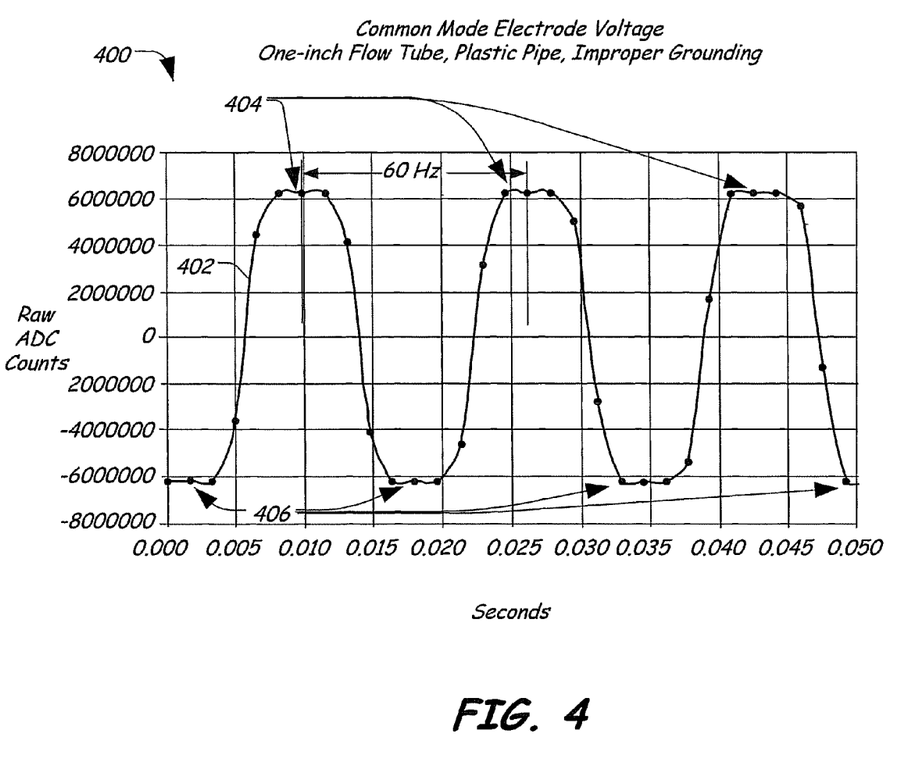
FIG. 4 is a graph of raw counts versus time for a common mode signal from a particular embodiment of a magnetic flow meter having a poor ground connection.

FIG. 4 is a graph 400 of raw analog-to-digital converter (ADC) counts versus time for a common mode signal from a particular embodiment of a magnetic flow meter having a poor ground connection. The particular magnetic flow meter included a one-inch flow tube section formed from plastic and having a poor ground connection. As shown, the graph 400 illustrates a substantially sinusoidal signal 402 that represents raw data samples from an analog-to-digital converter of a periodic signal having a period of 60 Hz. The flattened portions at 404 and 406 represent amplifier saturation that indicates line noise due to poor ground connections. If the ground connection is fixed, the sinusoidal signal is curved in the regions indicated by the reference number 404 and 406.

In general, the common mode line noise is demonstrated by the irregularity of the signal at 404 and 406. Common mode line noise detection circuitry is adapted to detect such irregularities to diagnose a poor electrical ground connection. A poor electrical ground connection can represent a corroded ground connection, a disconnected ground connection, another type of wiring problem, or any combination thereof.

Figure 5:
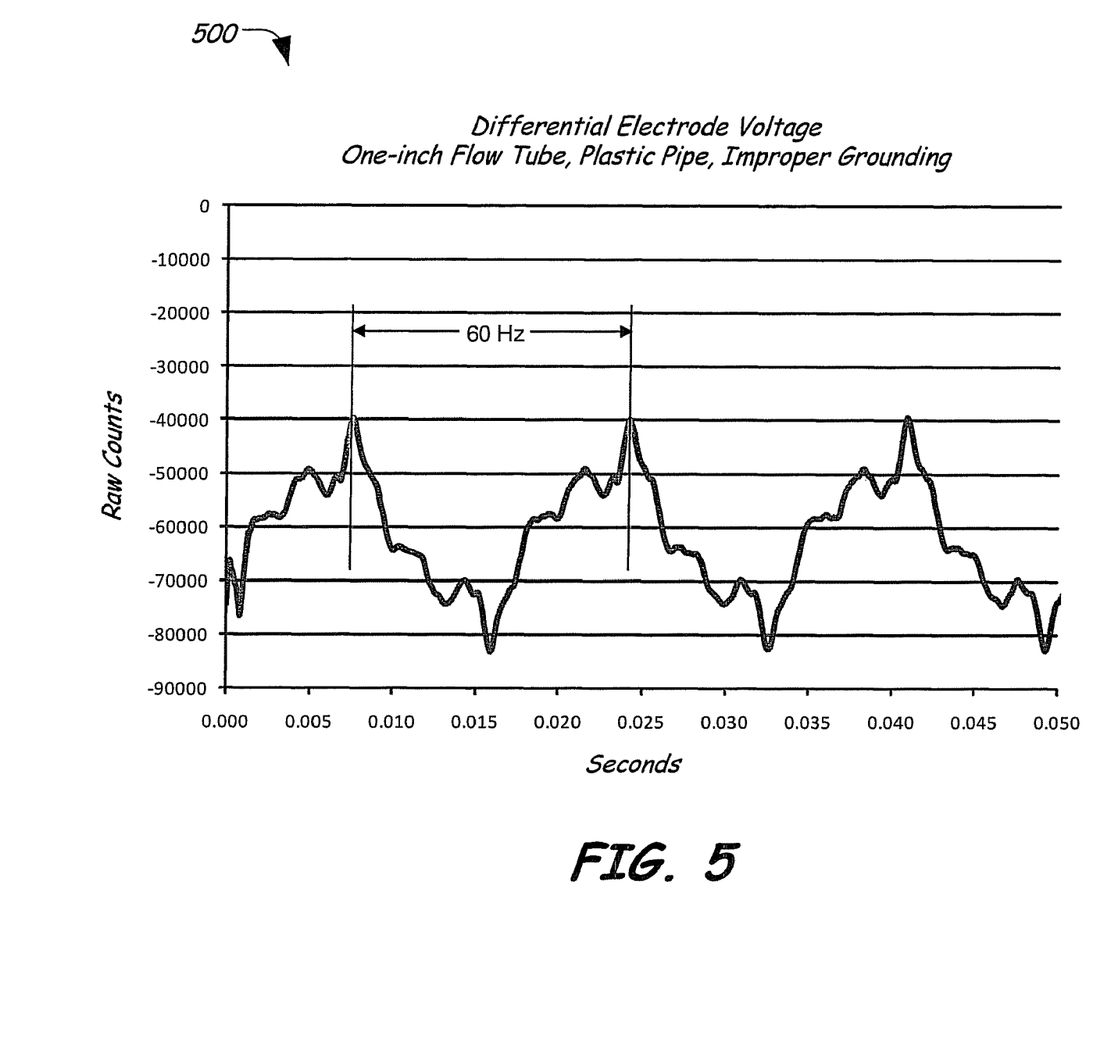
FIG. 5 is a graph of raw counts versus time for a differential mode signal from a particular embodiment of a magnetic flow meter having a poor ground connection.

FIG. 5 is a graph 500 of raw analog-to-digital converter (ADC) counts versus time for a differential mode signal from a particular embodiment of a magnetic flow meter having a poor electrical ground connection. The graph 500 shows a 60 Hz waveform of the differential electrode in a particular embodiment of a flow meter including a one-inch flow tube formed from plastic and having a poor electrical ground connection. The graph 500 illustrates distortion due to saturation of the amplifiers, which leads to an artificially low differential line noise value.

In a particular example, the differential line noise from the two electrodes may partially cancel out, reducing the amplitude of the differential mode noise signal. Reduction in the amplitude of the differential mode noise signal can make it difficult to detect line noise due to a poor electrical ground connection based on the differential mode noise signal alone. However, the common mode noise signal (as illustrated in FIG. 4) can be used to detect the poor electrical ground connection, while the differential mode noise signal could be used to determine which electrode has the poor ground connection.

Figure 6:
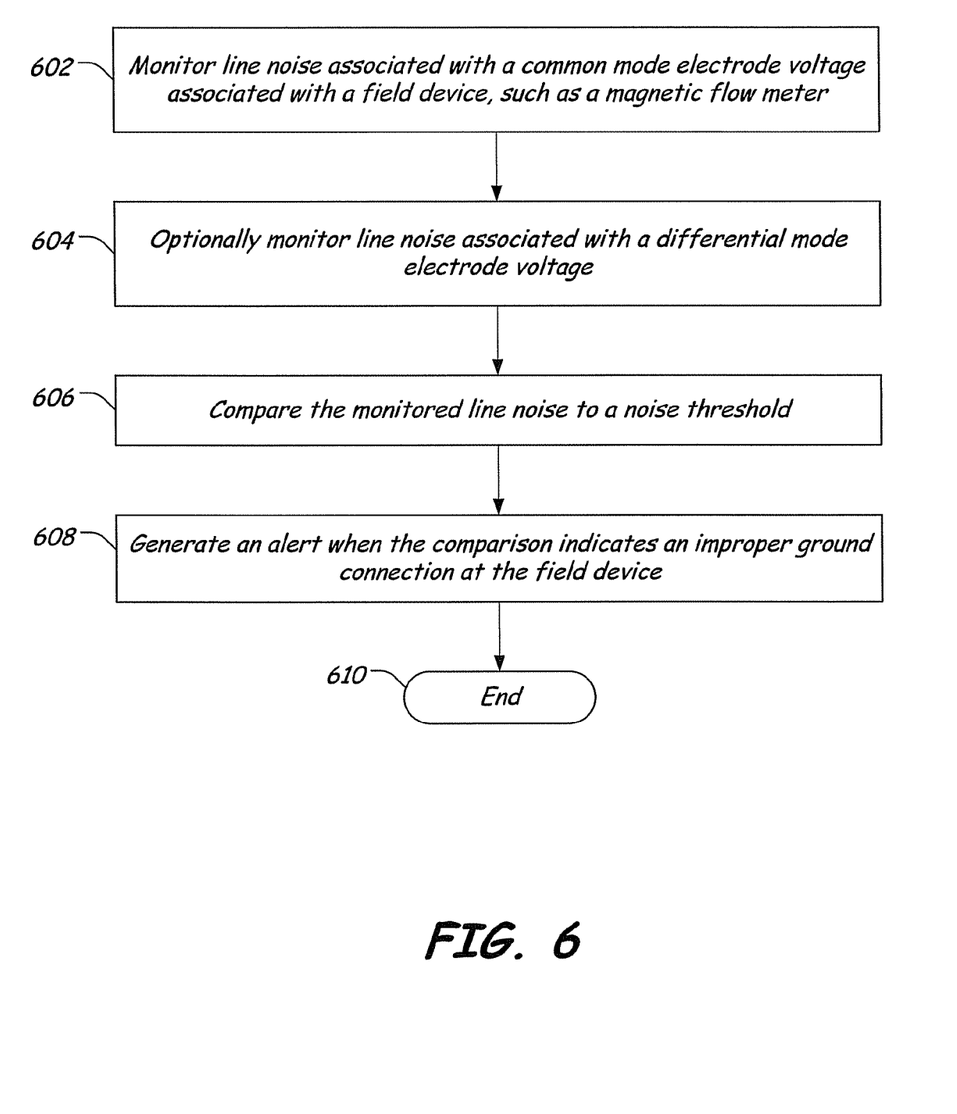
FIG. 6 is a flow diagram of a particular illustrative embodiment of a method of detecting a poor ground connection for a field device.

FIG. 6 is a flow diagram of a particular illustrative embodiment of a method of detecting a poor ground connection for a field device. At 602, line noise is monitored that is associated with a common mode electrode voltage of a field device, such as a magnetic flow meter. In a particular embodiment, common mode line noise may saturate operational amplifiers coupled to electrodes of the field device, which saturation can be detected. Advancing to 604, line noise optionally can be monitored that is associated with a differential mode electrode voltage of the field device. The differential line noise can be used to detect leakage, such as process fluid leakage into the isolated circuitry. In a particular embodiment, the differential line noise may be used in conjunction with the common mode line noise to detect a poor electrical ground connection. Continuing to 606, the monitored line noise is compared to a noise threshold. In a particular embodiment, the noise threshold may relate to a saturation voltage level of the operational amplifier. Proceeding to 608, an alert is generated when the comparison indicates a poor ground connection of the field device. In a particular example, the alert may be a signal that is transmitted to a control system. In another particular example, the alert may be a signal to illuminate a light-emitting diode at the field device. In still another particular example, the alert may be a control signal indicating a poor electrical ground connection for display at a liquid crystal display (LCD) of the field device. The method terminates at 610.

In conjunction with the systems, field devices, circuitry, and method disclosed above with respect to FIGS. 1-6, a field device is disclosed that includes diagnostic circuitry to detect a poor electrical ground connection based on line noise associated with a common mode voltage signal of an electrode pair within the field device, based on saturation of operational amplifiers coupled to the electrode pair, based on a differential mode voltage signal associated with the electrode pair, or any combination thereof. In a particular embodiment, an alert signal related to the detected poor ground connection can be generated and provided to one of a display device, a transmitter device, a control system, another device, or any combination thereof. While the above-discussion has been directed to magnetic flow meter field devices, it should be understood that the circuitry and/or the system to detect a poor electrical ground connection can be used with other types of field devices that include a pair of electrodes, where the associated ground connection is important to measurement accuracy.

Although the present invention has been described with reference to preferred embodiments, workers skilled in the art will recognize that changes may be made in form and detail without departing from the spirit and scope of the invention.

What is claimed is:

1. A field device comprising:
   a pair of electrodes coupled to a process fluid;
   a diagnostic circuit coupled to the pair of electrodes to monitor a common mode signal and adapted to detect a poor ground connection associated with at least one electrode of the pair of electrodes based on line noise associated with the common mode signal; and
   wherein the diagnostic circuit is adapted to detect the poor ground connection when the line noise exceeds a noise threshold.

2. The field device of claim 1, further comprising:
   coils to apply a magnetic field to the process fluid to induce an electromagnetic force (EMF) in the process fluid; and
   measurement circuitry coupled to the pair of electrodes and adapted to determine a fluid flow rate based on the EMF.

3. The field device of claim 2, wherein the measurement circuitry comprises at least one operational amplifier coupled to the pair of electrodes.

4. The field device of claim 3, wherein the at least one operational amplifier is saturated when the line noise associated with the common mode signal exceeds a noise threshold, and wherein the at least one operational amplifier distorts a common mode signal when saturated.

5. The field device of claim 1, wherein the diagnostic circuit is adapted to measure a noise amplitude associated with the line noise in the common mode signal, and wherein the noise threshold represents an amplitude sufficient to saturate at least one amplifier coupled to at least one electrode of the pair of electrodes.

6. The field device of claim 1, wherein the diagnostic circuit is further adapted to measure a differential mode signal to detect leakage of process fluid.

7. A magnetic flow meter for measuring a flow rate of a fluid in a pipe, the flow meter comprising:
   a flow tube adapted to couple to a pipe to carry a fluid;
   a magnetic coil disposed adjacent to the flow tube to induce an electromagnetic force (EMF) within the fluid;
   at least two electrodes disposed within the pipe, the at least two electrodes being electrically isolated from the flow-tube and one another;
   measurement circuitry coupled to the at least two electrodes and adapted to measure flow rate based on the induced EMF; and
   diagnostic circuitry coupled to the at least two electrodes to monitor a common mode signal and adapted to detect a poor electrical ground connection when line noise associated with the common mode signal exceeds a noise threshold.

8. The magnetic flow meter of claim 7, wherein the measurement circuitry comprises an operational amplifier coupled to at least one of the at least two electrodes.

9. The magnetic flow meter of claim 8, wherein the noise threshold comprises a power level sufficient to saturate the operational amplifier.

10. The magnetic flow meter of claim 7, wherein the diagnostic circuitry is further adapted to monitor a differential mode signal to determine a differential mode line noise, wherein the diagnostic circuitry includes logic to use the common mode line noise and the differential mode line noise to identify a particular electrode of the at least two electrodes having the poor electrical ground connection.

11. The magnetic flow meter of claim 10, wherein the diagnostic circuitry is adapted to monitor the common mode line noise and within a selected frequency range.

12. The magnetic flow meter of claim 11, wherein the selected frequency range comprises a frequency range from approximately 50 Hz to 60 Hz.

13. The magnetic flow meter of claim 11, wherein the selected frequency range is adjustable to detect line noise at particular frequencies.

14. The magnetic flow meter of claim 7, further comprising logic adapted to generate an alert in response to detecting the poor electrical ground connection.

15. A magnetic flow meter comprising:
   a flow tube coupled to a pipe and adapted to carry a process fluid;
   first and second electrodes extending into the flow tube and coupled to the process fluid; and
   a diagnostic circuit coupled to the first and second electrodes to monitor a common mode signal between the first and second electrodes, the diagnostic circuit adapted to detect a poor electrical ground connection associated with at least one of the first and second electrodes when common mode line noise associated with the common mode signal exceeds a noise threshold.

16. The magnetic flow meter of claim 15, further comprising coils adapted to apply a magnetic field to the process fluid to induce an electromagnetic force (EMF) within the process fluid.

17. The magnetic flow meter of claim 16, further comprising measurement circuitry coupled to the first and second electrodes and adapted to measure the EMF to determine a flow rate associated with the process fluid.

18. The magnetic flow meter of claim 15, wherein the diagnostic circuit is further adapted to monitor differential mode line noise associated with the first and second electrodes.

19. The magnetic flow meter of claim 18, further comprising logic adapted to determine which electrode of the first and second electrodes has the poor electrical ground connection based on the common mode line noise and the differential mode line noise.

* * * * *